US011835241B2

(12) United States Patent
Tedeschi

(10) Patent No.: US 11,835,241 B2
(45) Date of Patent: Dec. 5, 2023

(54) COOKING SYSTEM TEMPERATURE MANAGEMENT

(71) Applicant: SharkNinja Operating LLC, Needham, MA (US)

(72) Inventor: Michael A. Tedeschi, Quincy, MA (US)

(73) Assignee: SharkNinja Operating LLC, Needham, MA (US)

(*) Notice: Subject to any disclaimer, the term of this patent is extended or adjusted under 35 U.S.C. 154(b) by 237 days.

(21) Appl. No.: 17/220,280

(22) Filed: Apr. 1, 2021

(65) Prior Publication Data
US 2021/0310663 A1 Oct. 7, 2021

Related U.S. Application Data

(60) Provisional application No. 63/006,300, filed on Apr. 7, 2020.

(51) Int. Cl.
F24C 7/08 (2006.01)

(52) U.S. Cl.
CPC .................... F24C 7/088 (2013.01)

(58) Field of Classification Search
CPC ..... A47J 37/0629; F24C 7/082; F24C 15/106; F24C 7/088; H05B 1/0263
See application file for complete search history.

(56) References Cited

U.S. PATENT DOCUMENTS

| 4,829,159 A * | 5/1989 | Braun ............... G05D 23/1913 219/486 |
| 6,246,831 B1 * | 6/2001 | Seitz ................ G05D 23/1931 219/483 |
| 2004/0016747 A1 * | 1/2004 | Larson .............. H05B 1/0266 219/492 |

FOREIGN PATENT DOCUMENTS

| EP | 0531987 A2 | 3/1993 | |
| GB | 2339500 A * | 1/2000 | ........... F24C 15/106 |
| GB | 2339500 A | 1/2000 | |
| WO | 0077456 A1 | 12/2000 | |

OTHER PUBLICATIONS

International Search Report and Written Opinion received for PCT Application No. PCT/US2021/025362, dated Jun. 23, 2021, 13 pages.

* cited by examiner

Primary Examiner — Dana Ross
Assistant Examiner — Kuangyue Chen
(74) Attorney, Agent, or Firm — MINTZ LEVIN COHN FERRIS GLOVSKY AND POPEO, PC

(57) ABSTRACT

According to one or more implementations, a method is disclosed for operating heating elements disposed in a heating compartment of a cooking system. The method includes receiving a zero-crossing indication based on an alternating current and defined by zero-crossing circuitry. The method includes energizing a first heating element of the heating elements with the alternating current based on the zero-crossing indication and according to a modulation schedule.

20 Claims, 10 Drawing Sheets

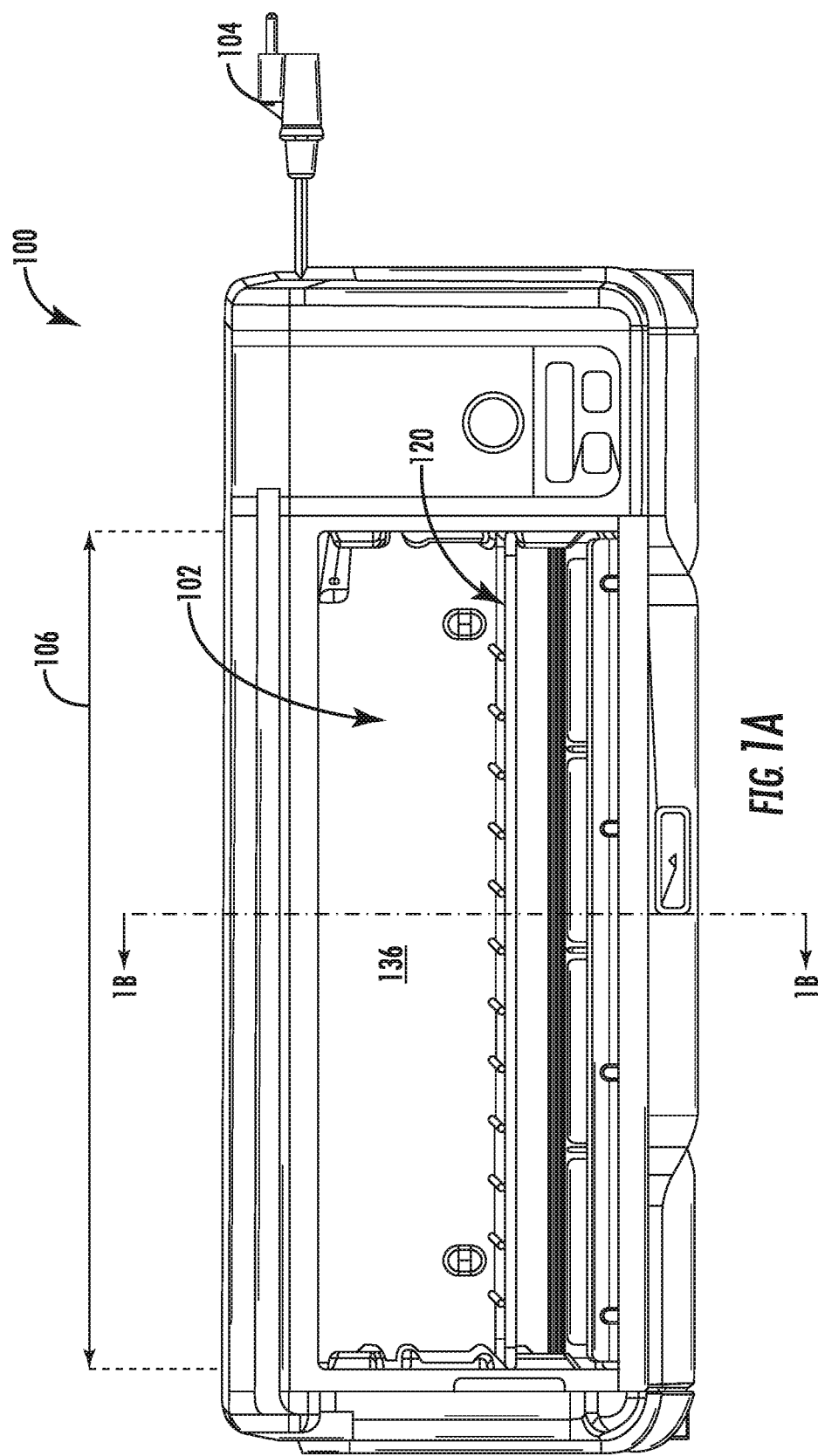

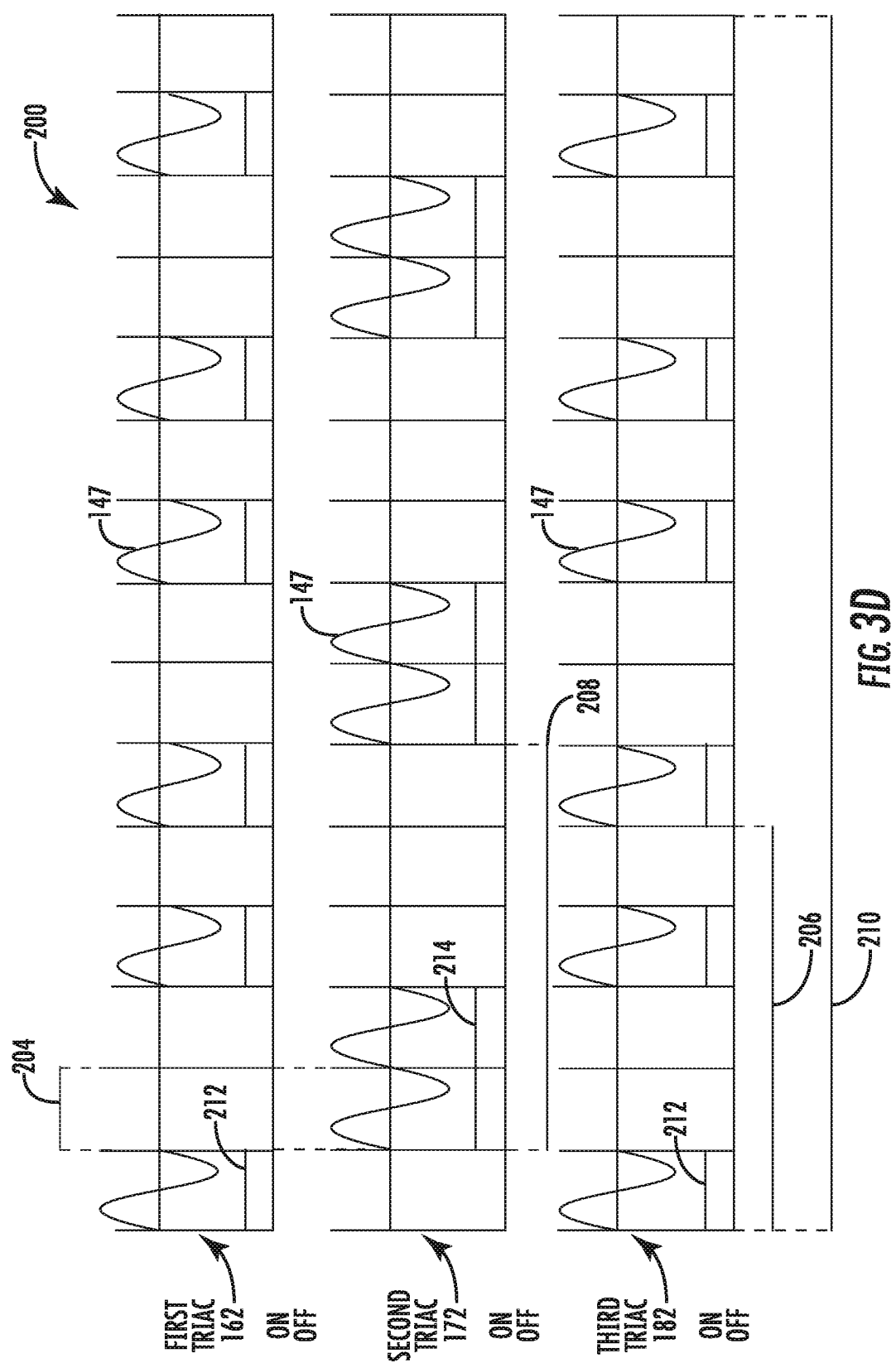

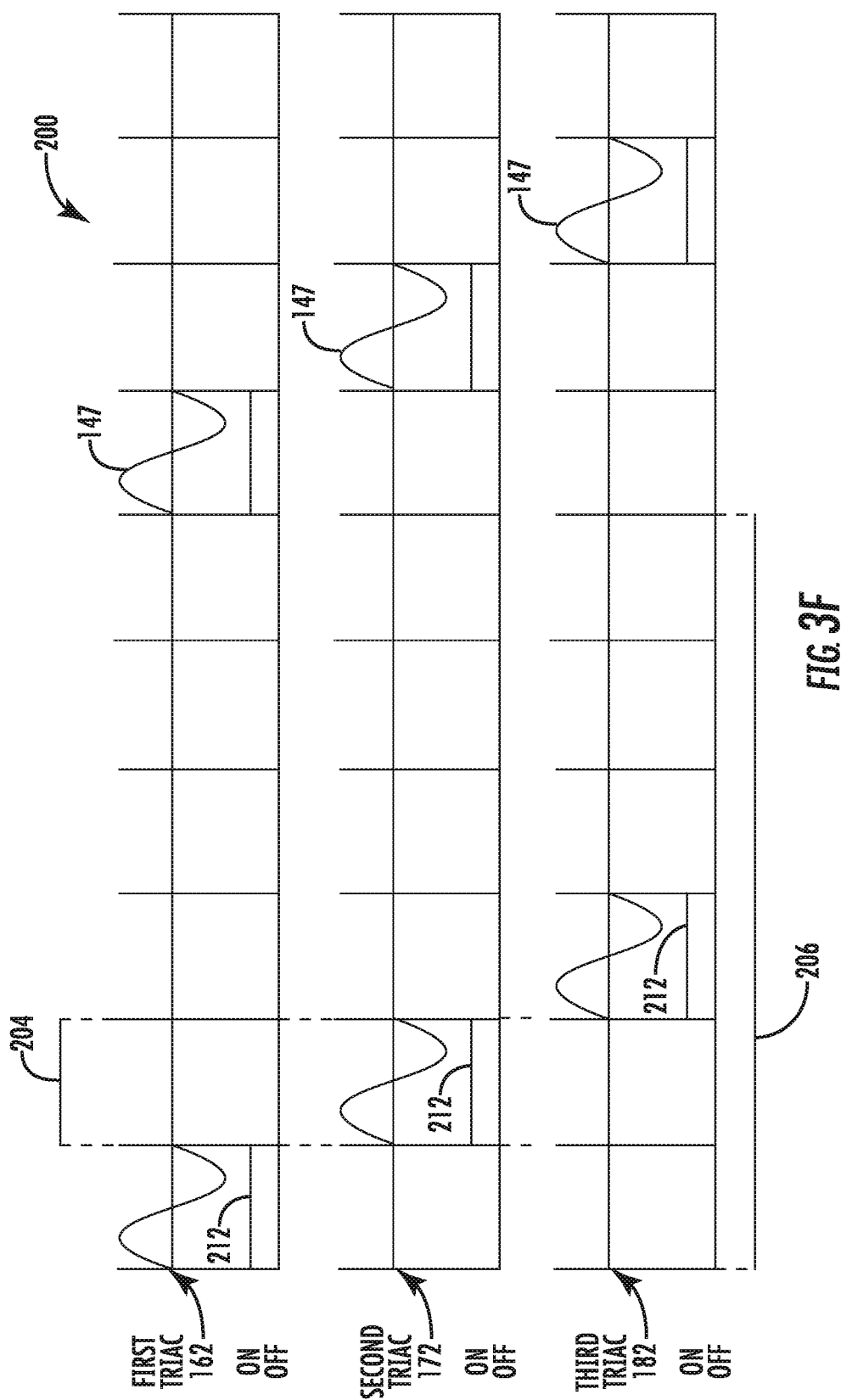

COOKING SYSTEM TEMPERATURE MANAGEMENT

CROSS REFERENCE TO RELATED APPLICATIONS

This application claims priority to U.S. Provisional Application 63/006,300 filed Apr. 7, 2020, entitled "Cooking System Temperature Management," which is hereby incorporated herein by reference in its entirety.

BACKGROUND

Embodiments of the present disclosure relate generally to a cooking system, and more particularly, to temperature management of the cooking system.

Existing countertop cooking systems, such as toaster ovens for example, may be used to conveniently warm or cook food in place of a larger wall mounted oven or a range for example. Countertop cooking systems typically cover a substantial amount of counter space. In a kitchen with limited counter space, the space occupied by the countertop cooking system when not in use is inconvenient for the user. As a result, a user may store the countertop cooking system elsewhere, reducing the accessibility and ease of use of the countertop cooking system.

SUMMARY

According to one or more implementations, a cooking system is disclosed. The cooking system includes an alternating current bus configured to conduct alternating current defining cycles. The cooking system includes a heating compartment. The cooking system includes heating elements comprising a first heating element disposed in the heating compartment and associated with the alternating current bus to conduct alternating current through the first heating element. The cooking system includes a first switch operable upon actuation to control energization of the first heating element. The cooking system includes zero-crossing circuitry cooperating with the alternating current bus configured to output a zero-crossing indication based on the cycles. The cooking system includes a controller having digital storage and instructions stored on the digital storage in controller-readable form that include a modulation schedule. The instructions are operable upon execution by the controller to receive the zero-crossing indication. The instructions are further operable upon execution to operate the first switch to energize the first heating element with the alternating current based on the zero-crossing indication and according to the modulation schedule.

According to one or more implementations, a method is disclosed for operating heating elements disposed in a heating compartment of a cooking system. The method includes receiving a zero-crossing indication based on an alternating current and defined by zero-crossing circuitry. The method includes energizing a first heating element of the heating elements with the alternating current based on the zero-crossing indication and according to a modulation schedule.

BRIEF DESCRIPTION OF THE FIGURES

The accompanying drawings incorporated in and forming a part of the specification embodies several aspects of the present disclosure and, together with the description, serves to explain the principles of the disclosure. In the drawings:

FIG. 1A depicts a front perspective view of a cooking system according to one or more implementations of the present disclosure;

FIG. 3D depicts a modulation schedule having a 600 W draw for a cooking system according to one or more implementations of the present disclosure;

FIG. 3F depicts a modulation schedule having a 250 W draw for a cooking system according to one or more implementations of the present disclosure;

The detailed description one or more possible, but not all, implementations of the present disclosure with reference to the drawings.

DETAILED DESCRIPTION

Figure 1B:
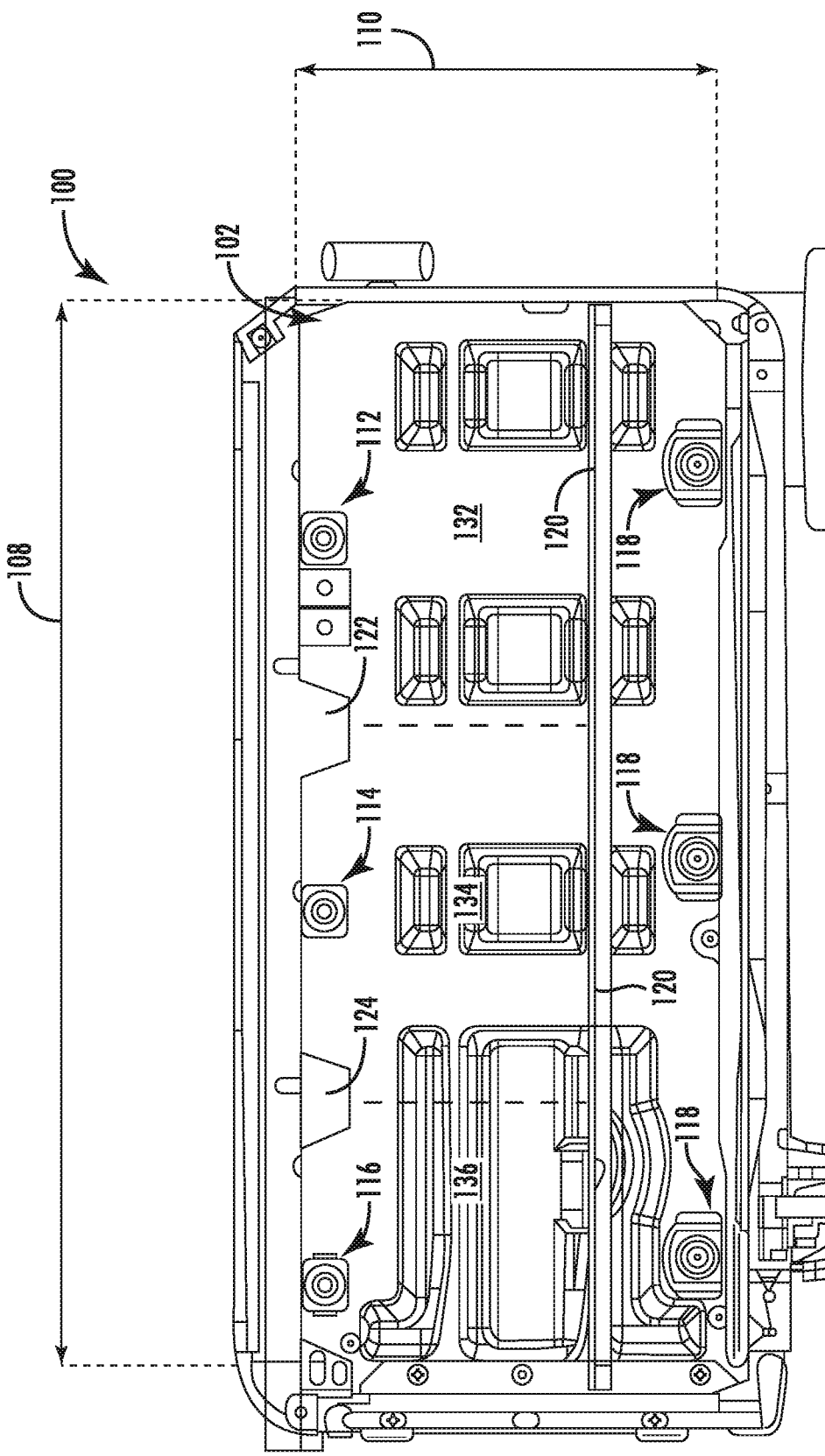
FIG. 1B depicts a side cross-sectional view of a cooking system according to one or more implementations of the present disclosure.

Referring to FIGS. 1A-1B a cooking system 100 is shown. The cooking system 100 includes a heating compartment 102 for heating food articles and an electrical plug 104 to provide electrical energy to the cooking system 100. The cooking system 100 includes feet for support and a door for closing the heating compartment 102. It should be appreciated that the heating compartment 102 may be any type of heating cavity or heating surface. The heating compartment 102 may be a cooktop or stove top. The cooking system 100 may be sized to fit on a countertop. The cooking system 100 may be operable to enable a user to rotate from the horizontal position (as shown) to a vertical position for storage. Indeed, the cooking system 100 may be shallow to allow nesting underneath kitchen cabinets. As an example, the width 106 and the depth 108 may be similar or substantially similar and the height 110 may be less than each of the width 106 and the depth 108. The height 110 may be less than half each of the width 106 and the depth 108. The height 110 may be less than one third each of the width 106 and the depth 108.

The heating compartment 102 includes at least one heating element. As an example, the heating compartment 102 includes heating elements 112, 114, 116, 118. The heating elements 112, 114, 116, 118 may be of any type including: metallic, ceramic, semiconducting, thick film, polymers, or any combination thereof. The heating element 112 may be a first heating element or any other (second, third, fourth), as it should be appreciated that the designation first, second, third, etc. is merely for clarity and should not limit the reference in the specification or the claims to any one of the heating elements 112, 114, 116, 118. The first heating element 112 heats the first heat zone 132 with respect to cooking surface 120. The cooking surface 120 may be any type of cooking surface 120 or combination thereof. As an example, the cooking surface 120 may be a frying basket, griddle, grate, grill, and/or a plate, bowl or similar article place upon a grill or other surface, or any other type of retainer for food articles. It should be appreciated that multiple cooking surfaces 120 may be inserted in the heating compartment 102 at the same time. As shown, the first heating element 112 traverses the heating compartment 102 across the width 106. It should be appreciated that the heating elements 112, 114, 116, 118 may be oriented in any fashion about the heating compartment 102.

A second heating element 114 is disposed in the heating compartment 102. The second heating element 114 may traverse the width 106 of the heating compartment 102. The second heating element 114 is associated with the second heating zone 134. It should be appreciated that the heating zones 132, 134, 136 may be merely defined according to the heating elements 112, 114, 116, and no physical designation is necessary.

A third heating element 116 is disposed in the heating compartment 102. The third heating element 116 may traverse the width 106 of the heating compartment 102. The third heating element 116 is associated with the third heat zone 136. As shown, each of the heating elements 112, 114, 116 may be spaced across the depth 108 of the heating compartment 102. The heating elements 112, 114, 116 may be disposed in the heating compartment 102 on a ceiling of the heating compartment 102.

A fourth heating element 118 or combination of heating elements may be disposed in the heating compartment 102. The fourth heating element 118 may be disposed on a base or floor of the heating compartment 102 (near the bottom).

The heating elements 112, 114, 116, 118 provide heat energy to the heating zones 132, 134, 136 by conduction to the air in contact with the heating element 112, 114, 116, 118 in the respective heating zone 132, 134, 136, convection by the movement of air in the heating zone 132, 134, 136 in contact with the heating element 112, 114, 116, 118, and by radiation from the heating element 112, 114, 116, 118 to any item in the heating zone 132, 134, 136.

The heating elements 112, 114, 116 may be disposed anywhere in the heating compartment 102. The heating elements 112, 114, 116 may be separated by baffles 122, 124. The first baffle 122 may deflect heat radiating from the first heating element 112 from the second heating zone 134, directing the radiant heat toward first heat zone 132. The second baffle 124 may deflect heat radiating from the second heating element 114 from the third heat zone 136, directing heat toward second heat zone 134. The first baffle 122 may deflect heat radiating from the second heating element 114 from the first heat zone 132, directing the radiant heat toward second heat zone 134. And, the second baffle 124 may deflect heat radiating from the third heating element 116 from the second heating zone 134, directing the radiant heat toward the third heat zone 136.

It should be appreciated that any of the heating elements 112, 114, 116, 118 may include any number of elements or heat generating partitions. It should be appreciated that the heating elements 112, 114, 116, 118 may be disposed on any wall of the heating compartment 102. As an example, the first heating element 112 may be disposed on the ceiling of the heating compartment 102, the second heating element 114 may be disposed on the back wall of the heating compartment 102, the third heating element 116 may be disposed on a side wall of the heating compartment 102, and the fourth heating element 118 may be disposed on the floor of the heating compartment. Any disposition of the heating elements 112, 114, 116, 118 is contemplated in this disclosure.

Figure 2:
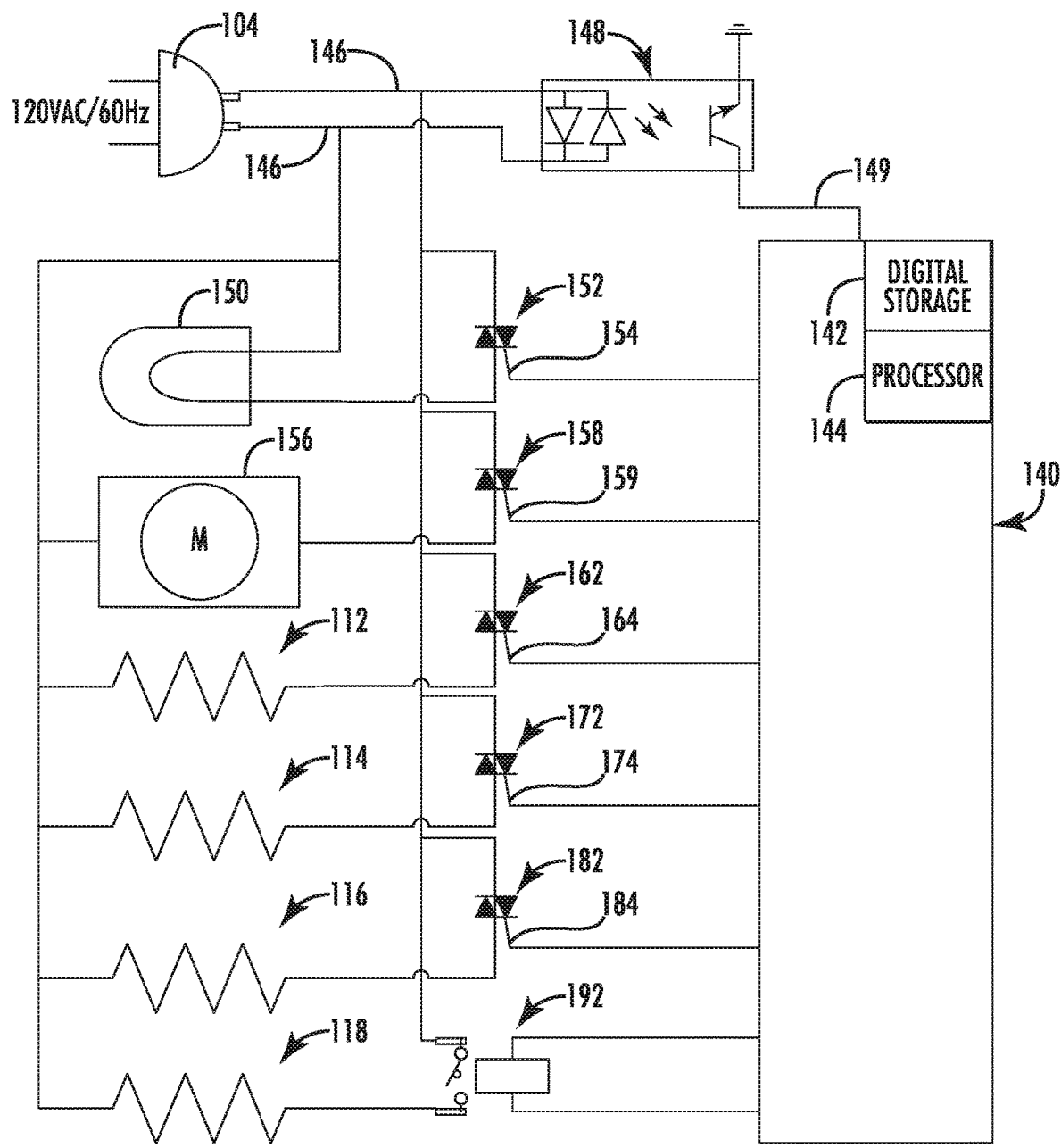
FIG. 2 depicts a schematic diagram of a cooking system according to one or more implementations of the present disclosure.

Referring to FIG. 2, a schematic diagram for a cooking system 100 is shown. The schematic diagram depicts a control system of the cooking system 100. The plug 104 may be inserted into an electrical outlet to provide the cooking system 100 with power. It should be appreciated that the plug 104 may also represent a hardwired connection to an electrical bus. The plug 104 is connected to the alternating current bus 146 to provide alternating current 147 (as shown in FIGS. 3A-3F). The alternating current bus 146 may define an alternating current bus power rating. The alternating current bus power rating may be based on government standards or other regulations related to the current capacity of the alternating current bus 146. As an example, the alternating current bus power rating may be 1800 W, corresponding to 15 A at 120 Vac. It should be appreciated that different current bus power ratings are appreciated by this disclosure, and number of heating elements 112, 114, 116, 118 and the modulation schedule 200 may be modified to utilize any potential alternating current bus power rating, including 2400 W.

The first heating element 112 may have a first power draw of 500 W when operated at full power without modulation. The second heating element 114 may have a second power draw 500 W when operated at full power without modulation. The third heating element 116 may have a third power draw 500 W when operated at full power without modulation. The fourth heating element 118 or elements may have a fourth power draw of 750 W when operated at full power without modulation. As such, the cumulative power draw rating of all of the heating elements 112, 114, 116, 118 (e.g., 2250 W) is greater than the alternating current bus power rating of 1800 W. As such the full power operation of the heating elements 112, 114, 116, 118, without modulation may exceed the alternating current bus power rating during operation.

A controller 140 is shown having digital storage 142 and a processor 144. The controller 140 may include any combination of processors, field programmable gate arrays (FPGA), or application specific integrated circuits (ASIC). The controller 140 may include memory, volatile and non-volatile, operable to store machine instructions from the processors and other processing mechanisms to receive, calculate, and control devices, as necessary. Machine instructions may be stored (e.g., stored instructions, stored machine instructions, stored steps) in any language or representation, including but not limited to machine code, assembly instructions, C, C++, C #, PASCAL, COBAL, PYTHON, JAVA, and RUBY. It should be appreciated that any type of wired or wireless configuration is appreciated for any of the communications from the controller 140. Controllers 140 may solve, broadly, the problem of heating food articles with cooking systems 100. Many solutions to food article heating exist today. As an example, microwave radiation, instead of infrared, may be used to heat food articles. As such this disclosure does not seek to forestall all solutions to the food article heating problem. One or more non-contemporary solutions to the food article heating problem are described herein.

One such application according to one or more implementations of the present disclosure includes the controller 140 being configured to receive a zero-crossing indication 149 from zero-crossing circuitry 148. The controller 140 may receive the zero-crossing indication 149 as a discrete input or another type of input (e.g., analog, digital). The zero-crossing circuitry 148 may be of any implement and disposed between the alternating current bus 146 and the controller 140. For brevity, resistors and other fundamental elements (e.g., resistors, capacitors, inductors) are not shown. The zero-crossing circuitry 148 may be or may include a LITE-ON LTV817C chip having a diode-transistor optocoupler. The zero-crossing circuitry 148 may include galvanic isolation to separate the alternating current bus 146 from the controller 140.

The alternating current bus 146 may supply power to a light 150, a convection fan motor 156, and the heating elements 112, 114, 116, 118. Switches 152, 158, 162, 172, 182, 192 may be used to individually operate the light 150, the motor 156, and the heating elements 112, 114, 116, 118, respectively. The switches 152, 158, 162, 172, 182, 192 may be TRIACs, SCRs, MOSFETs, electromechanical relays, IGBTs, or any other implement that enables current or voltage control of the switches 152, 158, 162, 172, 182, 192. The first switch 162 may be connected with the first heating element 112.

The light switch 152 may be connected with the light 150. The light switch 152 may include a light gate 154 operable to enable flow of the alternating current 147 from the alternating current bus 146 through the light 150. The light gate 154 may be controlled by the controller 140 through a current or voltage-controlled output of the controller 140.

As power is switched ON and OFF for the heating elements 112, 114, 116, 118 there may be resulting surges in power to the light 150 resulting in the potential for flickering. Switching at a rate of 15 times per second or more has been found to eliminate human-visible flickering. As such, the modulation schedule 200 may be increased by multiples of 15 to reduce human-visible flickering.

The motor switch 158 may be connected with the motor 156. The motor switch 158 may include a motor gate 159 operable to enable flow of the alternating current 147 from the alternating current bus 146 through the motor 156. The motor gate 159 may be controlled by the controller 140 through a current or voltage-controlled output of the controller 140.

The first switch 162 may be connected with the first heating element 112. The first switch 162 may include a first gate 164 operable to enable flow of the alternating current 147 from the alternating current bus 146 through the first heating element 112. The first gate 164 may be controlled by the controller 140 through a current or voltage-controlled output of the controller 140.

The second switch 172 may be connected with the second heating element 114. The second switch 172 may include a second gate 174 operable to enable flow of the alternating current 147 from the alternating current bus 146 through the second heating element 114. The second gate 174 may be controlled by the controller 140 through a current or voltage-controlled output of the controller 140.

The third switch 182 may be connected with the third heating element 116. The third switch 182 may include a third gate 184 operable to enable flow of the alternating current 147 from the alternating current bus 146 through the third heating element 116. The third gate 184 may be controlled by the controller 140 through a current or voltage-controlled output of the controller 140.

The fourth switch 192 may be connected with the fourth heating element 118. The fourth switch 192 may include a fourth gate 194 operable to enable flow of the alternating current 147 from the alternating current bus 146 through the fourth heating element 118. The fourth gate 194 may be controlled by the controller 140 through a current or voltage-controlled output of the controller 140. The fourth switch 192 may be an electromechanical relay.

The controller 140 may be configured through circuitry or otherwise include instructions to provide additional operation of the cooking system 100. As an example, the controller 140 may be integrated with a user interface operable to enable a user to select cooking system wattages, set cooking times, display the current time, chime bells, follow recipes, and perform other necessary human interactions. The user interface may include a display. The user interface may include a knob, pushbutton, or other controls to allow user interaction. The user interface may include a display.

Referring to FIGS. 3A-3F, a modulation schedule 200 is shown. The modulation schedule 200 may be disposed on the digital storage 142 or within the controller 140 to operate the switches 152, 158, 162, 172, 182, 192 according to the modulation schedule 200. As an example, the modulation schedule 200 may be defined as a case statement on the digital storage 142 having respective modulation schemes, depicted in each of the FIGS. 3A-3F, to operate the cooking system 100 according to a selection of the user. That is, the cooking system 100 is operable to enable a user to define the power consumption of the cooking system 100 through the modulation schedule 200. It should be appreciated that repetitious indications of reference numbers (e.g., 202) is not shown throughout FIGS. 3A-3F for clarity.

Figure 3A:
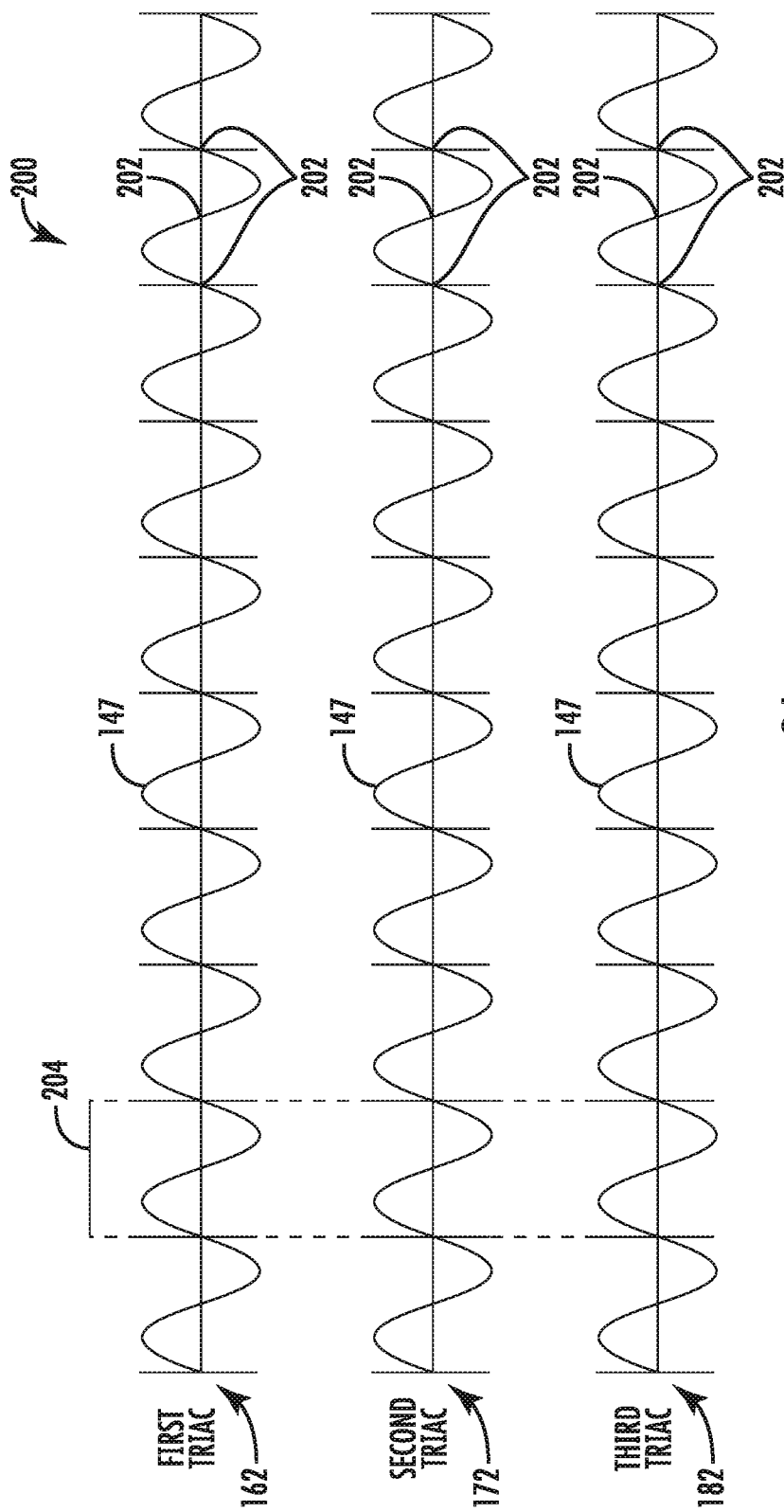
FIG. 3A depicts a modulation schedule having a 1500 W draw for a cooking system according to one or more implementations of the present disclosure.

As an example, in FIG. 3A, the modulation schedule 200 defines full power consumption of the first heating element 112 (controlled by the first TRIAC 162), the second heating element 114 (controlled by the second TRIAC 172), and the third heating element 116 (controlled by the third TRIAC 182) at 100% duty cycle. TRIAC may be any other implement of a switch. Such operation may occur during a broil operation selected by the user. As such, the power consumption of the cooking system 100 is 1500 W and is less than the alternating current bus power rating (1800 W). The alternating current 147 defines a zero-crossing 202 and a cycle 204. The zero-crossing 202 may be defined where the alternating current 147 is zero or a voltage of the alternating current 147 is zero. The cycle 204 may be a full current spectrum of the alternating current 147 of 360 degrees, as shown. The cycle 204 may also be defined as a partial spectrum of the alternating current 147 (e.g., 180 degrees, 90 degrees, 45 degrees). As such, the fourth heating element 118 may be off to ensure the alternating current bus power rating is not exceeded. It should be appreciated that the controller 140 may be configured to stop the alternating current 147 before the completion of a full cycle (e.g., 135). A cycle may be defined to begin and end any degree. The cycle may be defined to begin and end at zero degrees, 90 degrees, 180 degrees, or 360 degrees. The cycle may be any number of degrees including multiples of the aforementioned degrees (e.g., 720).

As an example, the cycle may begin at 30 degrees and end at 360 degrees or another degree. As another, the cycle may begin at zero degrees and end at 180 degrees. It should be appreciated that the present disclosure includes all of the heating elements 112, 114, 116, 118 being a part of the case statement for a particular modulation scheme such that all of the heating elements 112, 114, 116, 118 are energized individually without all of the heating elements 112, 114, 116, 118 being energized at the same time, allowing operation of all of the heating elements 112, 114, 116, 118 having a cumulative power draw rating greater than the alternating current bus power rating. As such, heat is dispersed about the heating compartment 102.

It should be appreciated that one or more of the heating elements 112, 114, 116, 118 or any combination thereof may have a cumulative power draw rating (e.g., 2250 W) greater than an alternating current bus power rating (e.g., 1800 W) of the alternating current bus 146. The modulation schedule 200 may operate one or more of the heating elements 112, 114, 116, 118 or any combination thereof to have a cumulative power draw (e.g., 1750 W) that is less than the alternating current bus power rating. It should be appreciated that this may be significant when substantially uniform heating across heat zones 132, 134, 136 is desired. That is, the modulation schedule 200 provides substantially uniform heating across heat zones 132, 134, 136 or any combination thereof while energizing heating elements 112, 114, 116, 118 or any combination thereof that have a cumulative power draw rating that is greater than the alternating current bus power rating.

Figure 3B:
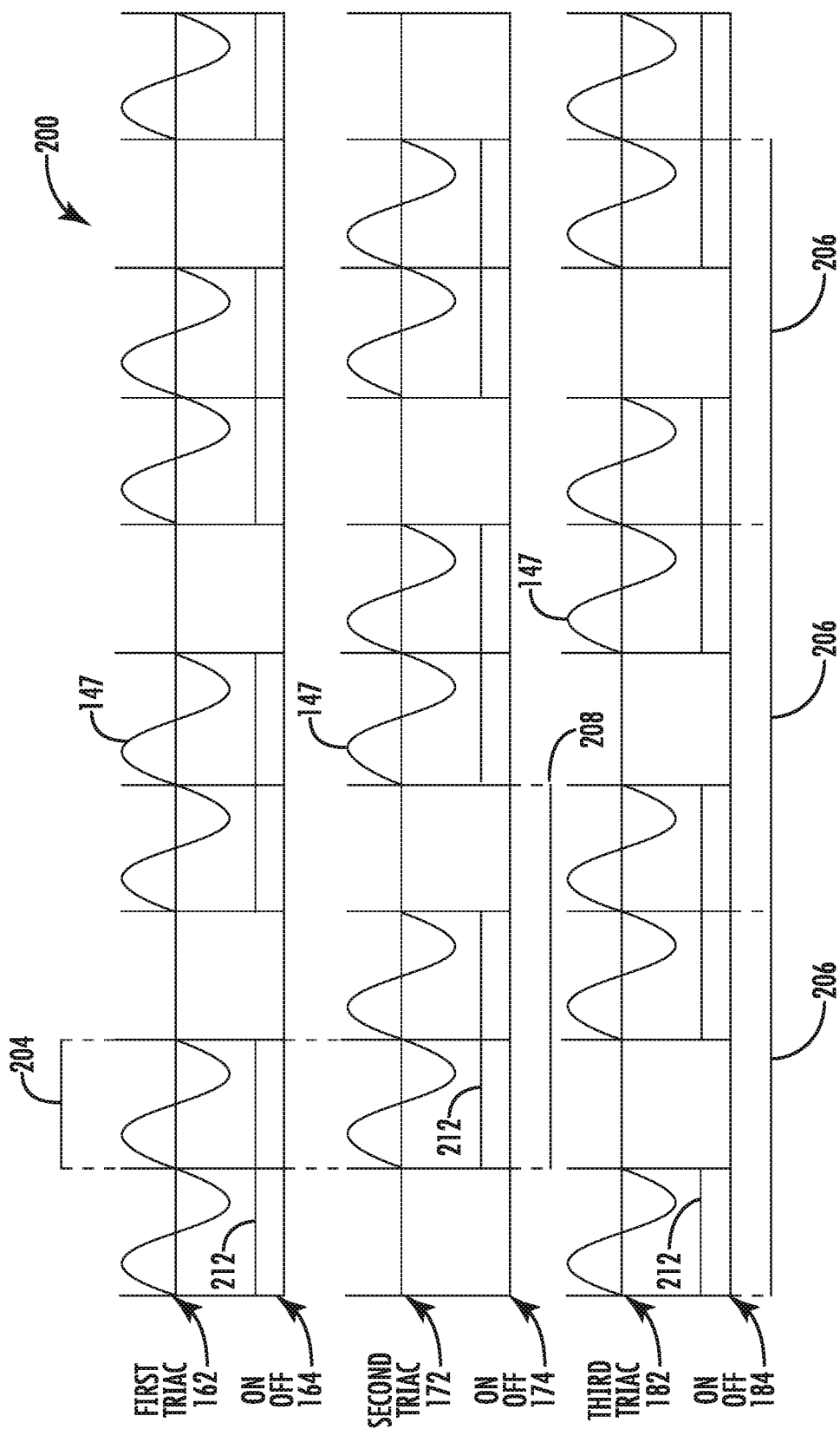
FIG. 3B depicts a modulation schedule having a 1000 W draw for a cooking system according to one or more implementations of the present disclosure.

As another example, in FIG. 3B, the modulation schedule 200 defines 1000 W, or 1750 W with the fourth heating element 118, operation of the cooking system 100. As shown, the modulation schedule 200 has a cycle 204. A quantity (e.g., three for 360 cycles, six for 180 cycles, twelve for 90 cycles) of the cycles 204 defines the first period 206. An ON status 212 of the respective switch 152, 158, 162, 172, 182, 192 representative of the associated status of the gates 154, 159, 164, 174, 184, 194 may define a duty cycle according to the first period 206. As shown the ON status 212 is less than or equal to two thirds (2:3, 66%), indicating that each of the switches 162, 172, 182 is ON for two cycles and OFF for one cycle.

As shown, the first period 206 is offset from a second period 208 having the same quantity of cycles 204 such that the first heating element 112 is energized a cycle 204 before the second heating element 114 is energized and deenergized before the second heating element 114 is deenergized. A third period offset from the first period 206 and the second period 208 may be defined for the third heating element 116. As shown, although the first heating element 112, the second heating element 114, and the third heating element 116 are energized to provided 1000 W of heat, only two of the heating elements 112, 114, 116 are energized at any one time. It should be appreciated that the fourth heating element 118 may be energized during this modulation scheme such that the total consumption by the heating elements 112, 114, 116, 118 is 1750 W and less than the alternating current bus power rating of 1800 W.

Figure 3C:
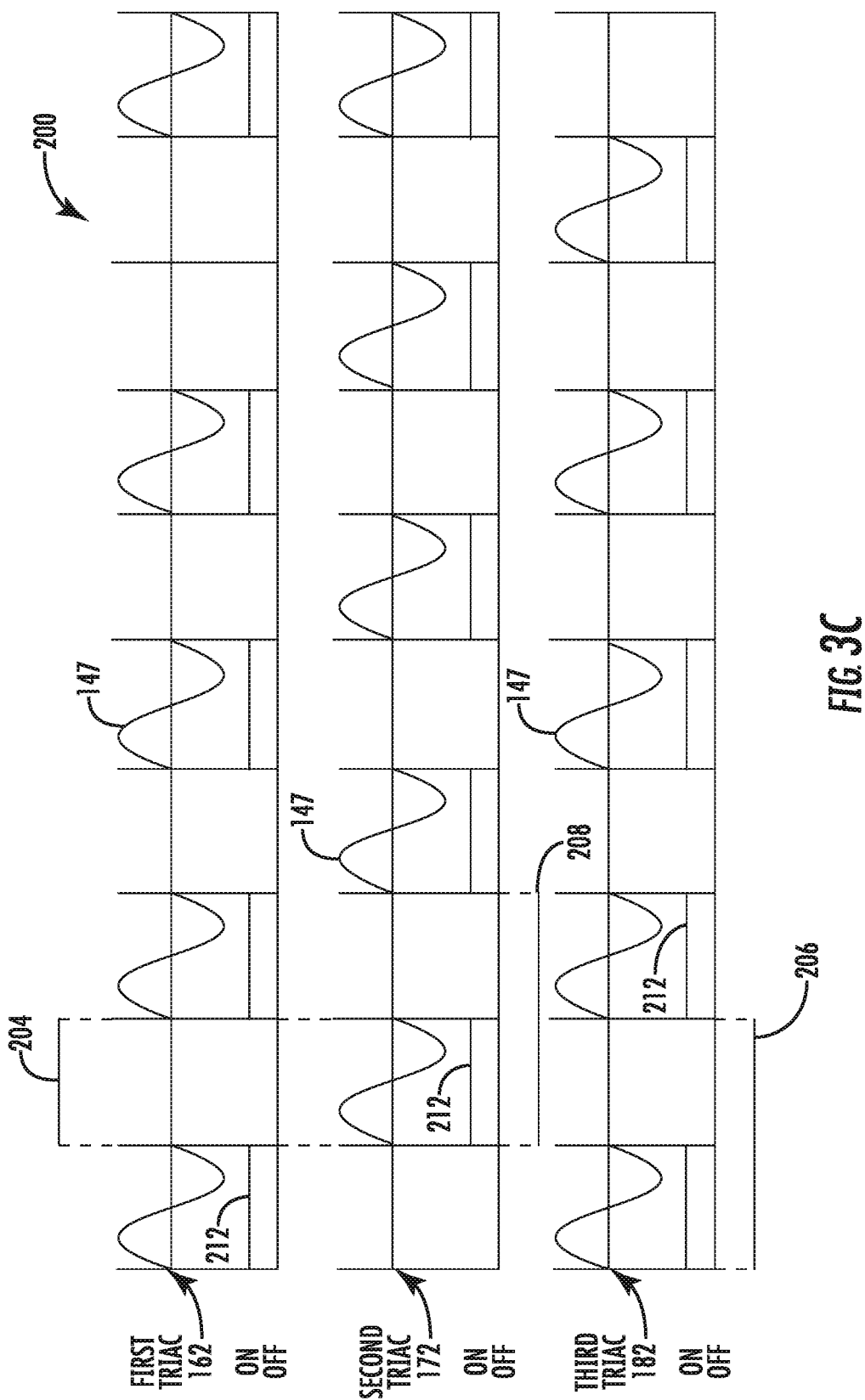
FIG. 3C depicts a modulation schedule having a 750 W draw for a cooking system according to one or more implementations of the present disclosure.

Referring to FIG. 3C, the modulation schedule 200 defines 750 W operation, or 1500 W operation with the fourth heating element 118, of the cooking system 100. As shown, the modulation schedule 200 has a cycle 204. A quantity (e.g., two for 360 cycles) of the cycles 204 defines the first period 206. A duty cycle may be defined according to the first period 206. As shown the duty cycle is one half (1:2, 50%), indicating that each of the switches 162, 172, 182 is ON for one cycle and OFF for one cycle. As shown, the first period 206 is offset from a second period 208 having the same quantity of cycles 204 such that the first heating element 112 is energized a cycle 204 before the second heating element 114 is energized and deenergized before the second heating element 114 is deenergized. The third heating element 116 may be energized according to the first period 206 and the one-half duty cycle. It should be appreciated that the fourth heating element 118 may be energized during this modulation scheme such that the total consumption by the heating elements 112, 114, 116, 118 is 1500 W and less than the alternating current bus power rating of 1800 W.

Referring to FIG. 3D, the modulation schedule 200 defines 600 W operation, or 1350 W operation with the fourth heating element 118, of the cooking system 100. As shown, the modulation schedule 200 has a cycle 204. A quantity (e.g., five for 360 cycles) of the cycles 204 defines the first period 206. An ON status 212 of the respective switch 152, 158, 162, 172, 182, 192 representative of the associated status of the gates 154, 159, 164, 174, 184, 194 may define a first duty cycle according to the first period 206. As shown, the first duty cycle is one third (1:3, 33%), indicating that each of the switches 162, 182 is ON for two cycles and OFF for three cycles. A second period 208 may also be defined as five of the cycles 204 having a second ON status 214 of the respective switch 152, 158, 162, 172, 182, 192 representative of the associated status of the gates 154, 159, 164, 174, 184, 194 may define a second duty cycle of two fifths (2:5, 40%).

As shown, the first period 206 is offset from a second period 208 having the same quantity (5) of cycles 204 such that the first heating element 112 is energized a cycle 204 before the second heating element 114 is energized and deenergized after the second heating element 114 is deenergized. The third heating element 116 may be energized similar to the first heating element 112. It should also be appreciated that the modulation scheme shown in FIG. 3D may be repeated according to a third period 210 defined by a fifteen-cycle quantity where the modulation schedule 200 is defined by a fifteen-cycle schedule instead of a five-cycle schedule. It should be appreciated that the fourth heating element 118 may be energized during this modulation scheme such that the total consumption by the heating elements 112, 114, 116, 118 is 1350 W and less than the alternating current bus power rating of 1800 W.

Figure 3E:
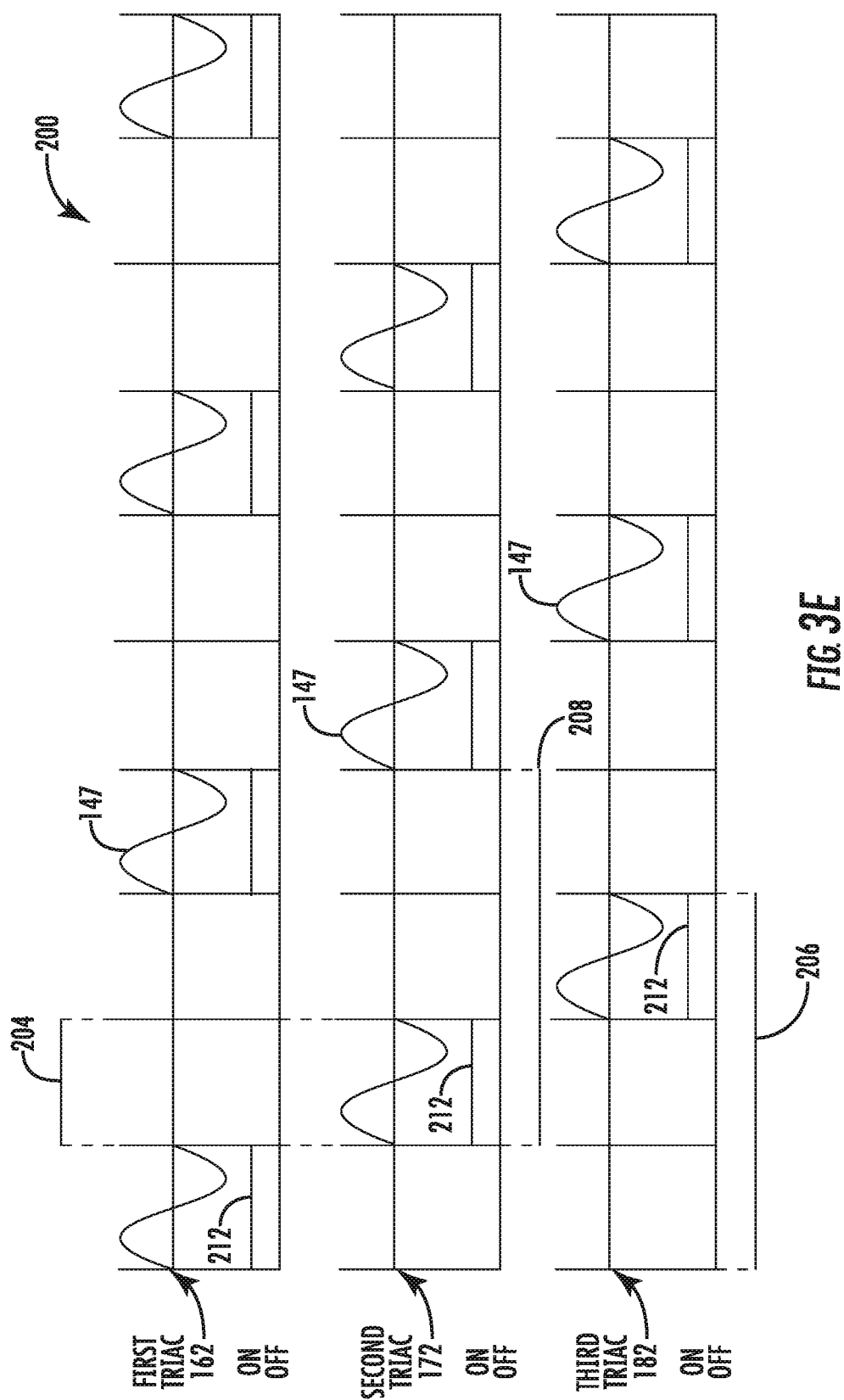
FIG. 3E depicts a modulation schedule having a 500 W draw for a cooking system according to one or more implementations of the present disclosure.

Referring to FIG. 3E the modulation schedule 200 defines 500 W operation, or 1250 W operation with the fourth heating element 118, of the cooking system 100. As shown, the modulation schedule has a cycle 204. A quantity (e.g., three for 360 cycles) of the cycles 204 defines the first period 206. A duty cycle may be defined according to the first period 206. As shown, the ON status 212 of the respective switch 152, 158, 162, 172, 182, 192 representative of the associated status of the gates 154, 159, 164, 174, 184, 194 may define the first duty cycle is one third (1:3, 66%), indicating that each of the switches 162, 172, 182 is ON for one cycle and OFF for two cycles. As shown, the first period 206 is offset from a second period 208 having the same quantity of cycles 204 such that the first heating element 112 is energized a cycle 204 before the second heating element 114 is energized and deenergized before the second heating element 114 is deenergized. The third heating element 116 may be energized according to the first period 206 and the one-third duty cycle. It should be appreciated that the fourth heating element 118 may be energized during this modulation scheme such that the total consumption by the heating elements 112, 114, 116, 118 is 1250 W and less than the alternating current bus power rating of 1800 W.

Referring to FIG. 3F the modulation schedule 200 defines 250 W operation, or 1000 W operation with the fourth heating element 118, of the cooking system 100. As shown, the modulation schedule has a cycle 204. A quantity (e.g., six for 360 cycles) of the cycles 204 defines the first period 206. A duty cycle may be defined according to the first period 206. As shown, the ON status 212 of the respective switch 152, 158, 162, 172, 182, 192 representative of the associated status of the gates 154, 159, 164, 174, 184, 194 may define the first duty cycle as one sixth (1:6, 16%), indicating that each of the switches 162, 172, 182 is ON for one cycle and OFF for five cycles. As shown, the first period 206 is offset from a second period 208 having the same quantity of cycles 204 such that the first heating element 112 is energized a cycle 204 before the second heating element 114 is energized and deenergized before the second heating element 114 is deenergized. The third heating element 116 may be energized according to the first period 206 and the one-third duty cycle. It should be appreciated that the fourth heating element 118 may be energized during this modulation scheme such that the total consumption by the heating elements 112, 114, 116, 118 is 1000 W and less than the alternating current bus power rating of 1800 W.

It should be appreciated that duty cycles may refer to the portion of the respective period 206, 208, 210 the switches 152, 158, 162, 172, 182, 192 are ON and OFF. The duty cycles may be any one or more of the cycles in the period 206, 208, 210. As an example, the period 206, 208, 210 may be three of the cycles 204. If the duty cycle is one third, the respective switch 152, 158, 162, 172, 182, 192 may be on for the first cycle, the second cycle, or the third cycle (last cycle). If the duty cycle is two thirds, the respective switch 152, 158, 162, 172, 182, 192 may be on for the first cycle and the second cycle, the first cycle and the third cycle, or the second cycle and the third cycle.

Figure 4:
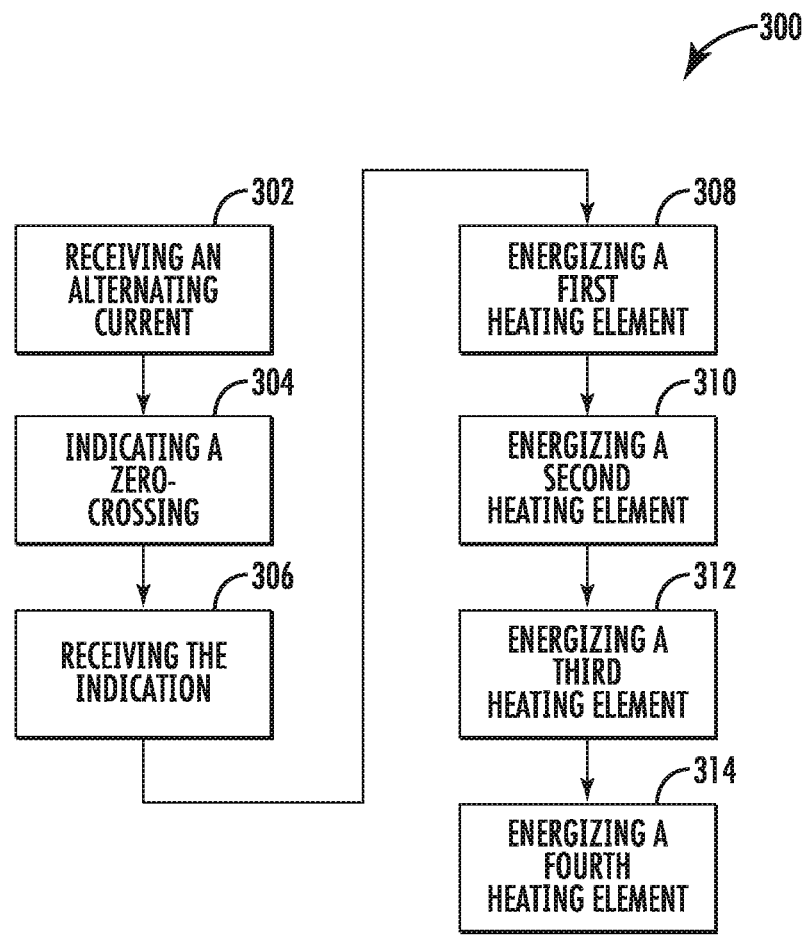
FIG. 4 depicts a method for operating a cooking system according to one or more implementations.

Referring to FIG. 4, a method 300 is depicted. It should be appreciated that any of the steps may be omitted, rearranged, or duplicated. The steps may be performed simultaneously or serially. In step 302, an alternating current 147 is received. The alternating current 147 may be received by the zero-crossing circuitry 148 in order to output the zero-crossing indication 149 in step 304. The zero-crossing indication 149 may be a pulse output, indicating where the alternating current 147 is zero. In step 306, the controller 140 receives the zero-crossing indication 149. Registers on the controller 140 may be set and cleared based on the zero-crossing indication 149. In step 308, a first heating element 112 is energized. The first heating element 112 may be energized by the controller 140. As an example, the controller 140 may control the switch 162 to allow or prevent flow of the alternating current 147 through the first heating element 112. The first heating element 112 may be energized based on the zero-crossing indication 149. The first heating element 112 may be energized according to a modulation schedule 200. The modulation schedule 200 may be stored as instructions on the controller 140. As an example, the modulation schedule 200 may be defined as a set of cases or as a case statement. The cases may be selected base on user input through the user interface. As an example, the user interface may allow the user to select broil. Broil may identify a case statement or modulation scheme within the stored modulation schedule 200. The case statement may include a series of steps for energizing the first heating element 112 with the first switch 162. As a non-limiting, practical application example, the steps may include: detecting a cycle based on the zero-crossing indication 149 (e.g., every other zero-crossing indication 149 is a complete cycle); initializing a count of cycles (e.g., count=0); receiving a duty cycle or retrieving a defined duty cycle; receiving a period 206, 208, 210 or retrieving a predefined period 206, 208, 210 associated with the case statement; setting a tag or identifier associated with a digital output and the switch 162 as TRUE based on the duty cycle and the period 206, 208, 210 in accordance with the case statement; setting the tag or identifier associated with the digital output and the switch 162 as FALSE based on the duty cycle and the period 206, 208, 210 in accordance with the case statement. As such, the controller 140 may energize the first heating element 112 based on the duty cycle and the period 206, 208, 210 associated with the case statement or modulation scheme.

In step 310 the second heating element 114 may be energized as described above similar to the first heating element 112. In step 312 the third heating element 116 may be energized as described above similar to the first heating element 112. In step 314, the fourth heating element 118 may be energized as described above similar to first heating element 112. It should be appreciated that each of the heating elements 112, 114, 116, 118 may be energized with respective digital outputs, drivers, switches 152, 158, 162, 172, 182, 192 and synchronized according to the zero-crossing indication 149 and the controller 140 to energize the heating elements 112, 114, 116, 118 according to the modulation schedule 200.

It should be appreciated that the wattage used by the heating elements 112, 114, 116, 118 may be defined according to a feedback loop. As an example, the user interface may be operable to enable a user to select a temperature for the heating compartment 102. The controller 140 may be configured to receive the selected temperature. The controller 140 may be configured to receive a recipe to vary the temperature with time. The controller 140 may be configured to receive the temperature in the heating compartment 102 by a temperature sensor 143 associated with an analog input. The controller 140 may then select the case statement or modulation scheme of the modulation schedule 200 based on the temperature received. As an example, the temperature may be lower than the selected temperature. The controller 140 may select the case statement that is associated with a wattage greater than the current case to increase the temperature. As an example, if the selected temperature is 300 F and the controller 140 is operating at 250 W (FIG. 3F) and the temperature inside the heating compartment 102 is 275 F, the controller 140 may select the case to operate the heating elements 112, 114, 116, 118 at 500 W (FIG. 3E).

It should be appreciated that first periods, second periods, and third periods being offset from one another in any direction (before or after) and by any number of cycles is contemplated by this disclosure.

The light switch 152 and the motor switch 158 may be phase-angle controlled. That is, the light 150 and the motor 156 may be energized for a portion of the entire cycle, beginning with a phase delay from the zero-crossing indication 149 and ending on the zero-crossing indication of the cycle 204. The phase delay may be based on the number of heating elements 112, 114, 116, 118 that are energized according to the modulation scheme (e.g., FIG. 3D). As an example, the modulation scheme shown in FIG. 3D may correspond with a 8.3 ms cycle and a 1.2 ms phase delay.

All references, including publications, patent applications, and patents cited herein are hereby incorporated by reference to the same extent as if each reference were individually and specifically indicated to be incorporated by reference and were set forth in its entirety herein.

It should be appreciated that any reference to first, second, third, fourth, etc. are used simply for clarity and may be interchangeably and limit the claims to that particular heating element. As an example, a first heating element is just a heating element with a particular designation for clarity. It may also be a second heating element or any other heating element. No attempts to limit the disclosure is presented or intended in any way based on designations for clarity.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A cooking system comprising:
    an alternating current bus configured to conduct alternating current defining cycles;
    a heating compartment;
    heating elements comprising a first heating element, said first heating element disposed in said heating compartment and associated with said alternating current bus to conduct said alternating current through said first heating element;
    a first switch operable upon actuation to control energization of said first heating element;
    zero-crossing circuitry cooperating with said alternating current bus configured to output a zero-crossing indication based on said cycles;
    a controller having digital storage and instructions stored on said digital storage in controller-readable form that include a plurality of modulation schedules each predefining a different energizing control of said heating elements, said instructions being operable upon execution by said controller to receive said zero-crossing indication, wherein said instructions are further operable upon execution to operate said first switch to energize said first heating element with said alternating current based on said zero-crossing indication and according to one of said plurality of modulation schedules.

2. The cooking system of claim 1, wherein said heating elements have a cumulative power draw rating greater than an alternating current bus power rating of said alternating current bus and a cumulative power draw of said heating elements energized according to one of said plurality of modulation schedules less than the alternating current bus power rating.

3. The cooking system of claim 1, wherein said heating elements further comprise a second heating element and a fourth heating element; and further comprising:
    a second switch operable upon actuation to control energization of said second heating element;
    a fourth switch operable upon actuation to control energization of said fourth heating element, and
    wherein said instructions are further operable upon execution by said controller to:
        operate said second switch to energize said second heating element with said alternating current based on said zero-crossing indication and according to one of said plurality of modulation schedules,
        operate said fourth switch to energize said fourth heating element with said alternating current while said first switch and said second switch are operated according to one of said plurality of modulation schedules such that a cumulative power draw of said heating elements is less than said alternating current bus power rating of said alternating current bus.

4. The cooking system of claim 3, wherein said first switch and said second switch are TRIACs and said fourth switch is an electromechanical relay.

5. The cooking system of claim 1, further comprising:
    a second switch operable upon actuation to control energization of a second heating element of said heating elements disposed in said heating compartment and associated with said alternating current bus to conduct said alternating current through said second heating element, and
    wherein said instructions are further operable upon execution by said controller to operate said second switch to energize said second heating element with said alternating current based on said zero-crossing indication and according to one of said plurality of modulation schedules.

6. The cooking system of claim 5, wherein one of said plurality of modulation schedules defines a first period according to a quantity of said cycles and a first duty cycle defined according to said first period and said first heating element is energized according to said first period and said first duty cycle.

7. The cooking system of claim 6, wherein said first duty cycle is less than or equal to two thirds of said first period, wherein said first heating element is energized for a first cycle of said first period and a last cycle of said first period based on said first duty cycle being two thirds.

8. The cooking system of claim 6, wherein said first duty cycle is greater than or equal to one sixth of said first period, and wherein said quantity of said cycles is greater than or equal to three, and less than or equal to fifteen.

9. The cooking system of claim 8, wherein said quantity of said cycles is a multiple of fifteen such that a flicker associated with a light disposed in said heating compartment when said quantity of said cycles is said multiple of fifteen is less than said flicker when said flicker associated with said light disposed in said heating compartment when said quantity of said cycles is fifteen.

10. The cooking system of claim 6, wherein one of said plurality of modulation schedules defines a second period according to said quantity of said cycles that is offset with respect to said first period by a one of said cycles and said second heating element is energized according to said second period and at least one of said first duty cycle and a second duty cycle.

11. The cooking system of claim 10, wherein said first duty cycle is one third and said second duty cycle is two fifths.

12. The cooking system of claim 6, wherein said quantity of said cycles is three and said first duty cycle alternates between one third to two thirds for every said first period in one of said plurality of modulation schedules.

13. The cooking system of claim 12, wherein said first heating element is energized for a first cycle of said first period and a last cycle of said first period based on said first duty cycle being two thirds.

14. The cooking system of claim 13, wherein one of said plurality of modulation schedules defines a second period that is five of said cycles and is offset with respect to said first period by a one of said cycles and said energizing said second heating element is according to said second period and said first duty cycle.

15. The cooking system of claim 1, wherein said first switch is a TRIAC said controller includes an output associated with a gate of said TRIAC, and said instructions are further operable upon execution by said controller to operate said gate.

16. The cooking system of claim 1, wherein said zero-crossing circuitry comprises a diode-transistor optocoupler.

17. The cooking system of claim 1, further comprising a user interface configured to receive an input of a user selecting one of a plurality of settings of the cooking system;
wherein said one of said plurality of modulation schedules corresponds to said selected one of said plurality of said settings.

18. A system comprising:
a heating compartment of a cooking system;
a plurality of heating elements including a first heating element configured to provide heat within the heating compartment and a second heating element configured to provide heat within the heating compartment;
a first switch configured to allow flow of alternating current (AC) to the first heating element;
a second switch configured to allow flow of the AC to the second heating element;
a user interface configured to receive an input of a user selecting one of a plurality of settings of the cooking system;
an AC bus configured to conduct AC defining cycles;
a controller; and
zero-crossing circuitry configured to receive the AC from the AC bus and to provide a pulse output to the controller indicative of where the AC is zero;
wherein the controller is configured to:
store instructions that define a plurality of modulation schemes, wherein each of the plurality of modulation schemes corresponds to different one of the plurality of settings,
after the user interface receives the input, control the first switch between a first state, in which the first switch allows flow of the AC to the first heating element, and a second state, in which the first switch prevents flow of the AC to the first heating element, wherein the control of the first switch is based on the pulse output and is defined in the one of the plurality of modulation schemes corresponding to the selected one of the plurality of settings, and
after the user interface receives the input, control the second switch between a third state, in which the second switch allows flow of the AC to the second heating element, and a fourth state, in which the second switch prevents flow of the AC to the second heating element, wherein the control of the second switch is based on the pulse output and is defined in the one of the plurality of modulation schemes corresponding to the selected one of the plurality of settings.

19. The system of claim 18, wherein the plurality of heating elements include one or more additional heating elements configured to provide heat within the heating compartment;
the system further comprises one or more additional switches, each of the one or more additional switches being associated with a different one of one or more additional heating elements;
control of the one or more additional switches is defined in the one of the plurality of modulation schemes corresponding to the selected one of the plurality of settings; and
the controller is configured to, after the user interface receives the input, control the one or more additional switches as defined in the one of the plurality of modulation schemes corresponding to the selected one of the plurality of settings.

20. A system comprising:
a heating compartment of a cooking system;
a plurality of heating elements including a first heating element configured to provide heat within the heating compartment and a second heating element configured to provide heat within the heating compartment;
a first switch configured to allow flow of alternating current (AC) to the first heating element;
a second switch configured to allow flow of the AC to the second heating element;
an AC bus configured to conduct AC defining cycles;
a controller; and
zero-crossing circuitry configured to receive the AC from the AC bus and to provide a pulse output to the controller indicative of where the AC is zero;
wherein the controller is configured to:
control the first switch between a first state, in which the first switch allows flow of the AC to the first heating element, and a second state, in which the first switch prevents flow of the AC to the first heating element, wherein the control of the first switch is based on the pulse output and on one of a plurality of preprogrammed modulation schedules, and
control the second switch between a third state, in which the second switch allows flow of the AC to the second heating element, and a fourth state, in which the second switch prevents flow of the AC to the second heating element, wherein the control of the second switch is based on the pulse output and on the one of the plurality of preprogrammed modulation schedules;
wherein a quantity of the cycles defines a first cycle;
each of the plurality of preprogrammed modulation schedules defines a different duty cycle according to the first period; and
the first state of the first switch and the third state of the second switch define each of the different duty cycles.

* * * * *